United States Patent
Matthews et al.

(10) Patent No.: US 8,627,227 B2
(45) Date of Patent: Jan. 7, 2014

(54) ALLOCATION OF SPACE IN AN IMMERSIVE ENVIRONMENT

(71) Applicant: Microsoft Corporation, Redmond, WA (US)

(72) Inventors: David A. Matthews, San Francisco, CA (US); Matthew I. Worley, Bellevue, WA (US); Nils A. Sundelin, Bothell, WA (US); Tsz Yan Wong, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/656,639

(22) Filed: Oct. 19, 2012

(65) Prior Publication Data

US 2013/0044136 A1    Feb. 21, 2013

Related U.S. Application Data

(63) Continuation of application No. 12/972,611, filed on Dec. 20, 2010.

(51) Int. Cl.
*G06F 3/048* (2013.01)

(52) U.S. Cl.
USPC .......................... 715/788; 715/792; 715/798

(58) Field of Classification Search
USPC .......... 715/792, 797, 806, 788, 798, 799, 800
See application file for complete search history.

(56) References Cited

U.S. PATENT DOCUMENTS

| 5,487,143 | A | * | 1/1996 | Southgate | ..................... 715/790 |
| 5,586,244 | A |   | 12/1996 | Berry et al. | |
| 5,742,285 | A |   | 4/1998 | Ueda | |
| 5,889,517 | A | * | 3/1999 | Ueda et al. | ..................... 715/803 |
| 6,232,971 | B1 |  | 5/2001 | Haynes | |
| 6,601,233 | B1 |  | 7/2003 | Underwood | |

(Continued)

FOREIGN PATENT DOCUMENTS

| CN | 102591571 | 7/2012 |
| KR | 20100010072 | 2/2010 |

OTHER PUBLICATIONS

"A New Era in Visual Simulation", http://www.reality-xp.com/professional/files/Microsoft%20ESP%_20Datasheet.pdf, (2007), 2 pages.

(Continued)

*Primary Examiner* — Kieu Vu
*Assistant Examiner* — Blaine Basom
(74) *Attorney, Agent, or Firm* — Wolfe-SBMC (57) ABSTRACT

A computing device includes an immersive environment module for facilitating simultaneous display of a plurality of applications on a display device without relying on system chrome. At least a first of the applications is displayed in a primary region of the display. The computing device also includes a UI management component for enabling a user selection of an application for simultaneous display on the display device with at least one other application. Processing logic is configured to determine a size in at least one direction of content of a user-selected application as it is displayed on a non-primary region of the display device simultaneous with display of content of the first application on the primary region of the display device. The determination is based at least in part on one or more pre-defined size requirements specified by the selected application.

19 Claims, 10 Drawing Sheets

(56) References Cited

U.S. PATENT DOCUMENTS

| | | | |
|---|---|---|---|
| 6,608,637 | B1 | 8/2003 | Beaton et al. |
| 6,636,246 | B1 | 10/2003 | Gallo et al. |
| 6,724,403 | B1 * | 4/2004 | Santoro et al. ........... 715/765 |
| 7,028,264 | B2 | 4/2006 | Santoro et al. |
| 7,484,182 | B1 * | 1/2009 | Smith ........... 715/794 |
| 7,577,914 | B1 | 8/2009 | Stuple et al. |
| 7,681,143 | B2 | 3/2010 | Lindsay et al. |
| 8,230,355 | B1 | 7/2012 | Bauermeister et al. |
| 2005/0044058 | A1 | 2/2005 | Matthews et al. |
| 2005/0060658 | A1 * | 3/2005 | Tsukiori ........... 715/765 |
| 2005/0108655 | A1 | 5/2005 | Andrea et al. |
| 2006/0005114 | A1 | 1/2006 | Williamson et al. |
| 2006/0010394 | A1 | 1/2006 | Chaudhri et al. |
| 2006/0015820 | A1 * | 1/2006 | Wood ........... 715/788 |
| 2006/0248471 | A1 * | 11/2006 | Lindsay et al. ........... 715/800 |
| 2007/0006094 | A1 | 1/2007 | Canfield et al. |
| 2007/0180401 | A1 * | 8/2007 | Singh et al. ........... 715/794 |
| 2007/0226647 | A1 | 9/2007 | Louch |
| 2007/0250787 | A1 * | 10/2007 | Kawahara et al. ........... 715/782 |
| 2009/0021486 | A1 | 1/2009 | Chaudhri et al. |
| 2009/0059073 | A1 | 3/2009 | Cho et al. |
| 2009/0070673 | A1 | 3/2009 | Barkan et al. |
| 2009/0094562 | A1 | 4/2009 | Jeong et al. |
| 2009/0210795 | A1 | 8/2009 | Katsuranis |
| 2009/0307105 | A1 | 12/2009 | Lemay et al. |
| 2010/0042911 | A1 | 2/2010 | Wormald et al. |
| 2010/0088635 | A1 | 4/2010 | Louch |
| 2010/0302172 | A1 | 12/2010 | Wilairat |
| 2011/0107272 | A1 | 5/2011 | Aguilar |
| 2011/0119586 | A1 | 5/2011 | Blinnikka et al. |
| 2011/0252380 | A1 | 10/2011 | Chaudhri |
| 2012/0304092 | A1 | 11/2012 | Jarrett et al. |
| 2012/0304108 | A1 | 11/2012 | Jarrett et al. |
| 2013/0047105 | A1 | 2/2013 | Jarrett |

OTHER PUBLICATIONS

"International Search Report and Written Opinion", Application No. PCT/US2009/065701, (Aug. 24, 2012), 8 pages.

"PCT Search Report and Written Opinion", Application No. PCT/US2011/055523, (May 10, 2012), 9 pages.

"PCT Search Report and Written Opinion", Application No. PCT/US2011/055524, (Jun. 1, 2012), 8 pages.

Dernbach, Christoph "Mac OS 7.0", >http://www.mac-history.net/computer-history/2008-05-24/_mac-os-70-2<(May 24, 2008), 6 pages.

Schmalstieg, et al., "Bridging Multiple User Interface Dimensions with Augmented Reality", Retrieved from: >Http:!/3citeseerx.ist.psu.edu/viewdoc/download?doi=10.1.1.43.5429&rep=rep1_&type=_pdf< *Proceedings IEEE and ACM D International Symposium on Augmented Reality*, (2000), 10 pages.

"Non-Final Office Action", U.S. Appl. No. 13/657,646, (Jan. 3, 2013), 13 pages.

"Non-Final Office Action", U.S. Appl. No. 13/118,339, (Feb. 11, 2013), 15 pages.

"Non-Final Office Action", U.S. Appl. No. 13/118,347, (Feb. 12, 2013), 14 pages.

"Non-Final Office Action", U.S. Appl. No. 12/972,611, (Mar. 13, 2013), 31 pages.

"Final Office Action", U.S. Appl. No. 13/657,646, (May 6, 2013), 12 pages.

"Final Office Action", U.S. Appl. No. 13/118,347, (Aug. 15, 2013), 25 pages.

"Final Office Action", U.S. Appl. No. 13/118,339, (Aug. 22, 2013), 21 pages.

"Final Office Action", U.S. Appl. No. 12/972,611, (Oct. 11, 2013), 19 pages.

* cited by examiner

ALLOCATION OF SPACE IN AN IMMERSIVE ENVIRONMENT

RELATED APPLICATION

This application is a continuation of and claims priority under 35 U.S.C. §120 to U.S. patent application Ser. No. 12/972,611, filed on Dec. 20, 2010, the disclosure of which is incorporated by reference herein in its entirety.

BACKGROUND

Managing applications and corresponding running items (e.g., open windows) on a computer has become increasingly difficult and burdensome, as computers are more heavily relied upon now than in the past. The availability of computers having increased computer speed and memory, in addition to improved overall computer performance over the last several years has provided users with the capability to efficiently run multiple applications at the same time, which was not practical in the past. Users can run a large variety of applications, and frequently run more than one application at a time.

Conventional operating systems permit users to view and interact with multiple computing applications through windows. Each of these windows generally includes a frame having controls for interacting with the computing application as well as controls for moving, sizing, or otherwise managing the layout of the window. These window frames, however, occupy portions of a display that might otherwise be dedicated to an application's content. Furthermore, managing the layouts of these windows through these controls can be time-consuming, annoying and distracting to users.

SUMMARY

This document describes techniques and apparatuses for creating an immersive environment. The immersive environment described herein can present multiple applications without dedicating significant amounts of a display to window frames for the applications. These techniques and/or apparatuses enable a user to view and interact with the content of a single application that is presented full screen (i.e., without system chrome) on a display while maintaining much of the power and flexibility that is available when multiple window frames are available. System chrome refers to the user-interactive graphical elements provided by the system for identifying and managing the regions or windows In some implementations the amount of space allocated to the applications when they are presented in a non-primary region of the display may be determined at least in part on minimum and/or maximum sizes that are specified by the applications themselves. This capability allows application developers to effectively participate in the process used by the computing device when determining how the content of their applications will be presented on the display. For example, different content from different applications may require different amounts of screen space in order to be useful. Accordingly, different applications may specify different minimum sizes below which they should not be presented on the display. Likewise, there may be a maximum size above which content may no longer be useful in practice because of content limitations or other reasons.

This summary is provided to introduce simplified concepts for managing an immersive environment that are further described below in the Detailed Description. This summary is not intended to identify essential features of the claimed subject matter, nor is it intended for use in determining the scope of the claimed subject matter. Techniques and/or apparatuses for managing an immersive environment are also referred to herein separately or in conjunction as the "techniques" as permitted by the context.

BRIEF DESCRIPTION OF THE DRAWINGS

Embodiments for managing an immersive environment are described with reference to the following drawings. The same numbers are used throughout the drawings to reference like features and components.

DETAILED DESCRIPTION

Overview

Some operating systems permit users to view and interact with a single computing application with little or no window frame, generally by presenting content of an application on all or nearly all of a computer's display. While this technique permits more of an application's content to be viewed, it lacks much of the flexibility permitted by the window-based techniques This document describes techniques and apparatuses for creating an immersive environment in which a user can view and interact with the content of a single application that is presented full screen (e.g., without system chrome) on a display while maintaining much of the power and flexibility that is available when multiple window frames are available. In particular, the immersive environment can present multiple applications without dedicating significant portions of the display to window frames for the applications.

Example Environment

Figure 1:
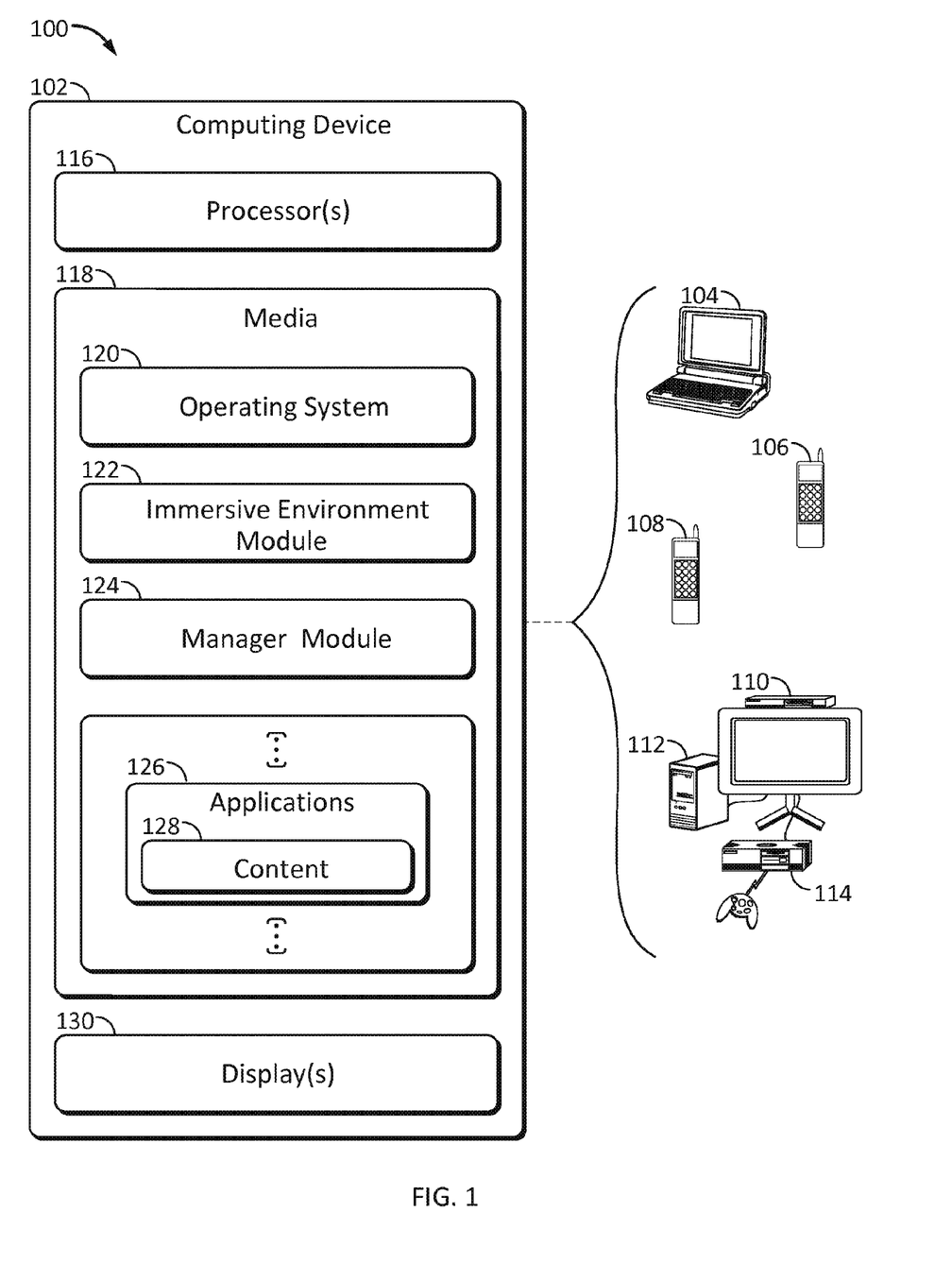
FIG. 1 illustrates an example system in which techniques for creating an immersive environment can be implemented.

FIG. 1 illustrates an example system 100 in which techniques for managing an immersive environment can be embodied. System 100 includes a computing device 102, which is illustrated with six examples: a laptop computer 104, a tablet computer 106, a smart phone 108, a set-top box 110, a desktop computer 112, and a gaming device 114, though other computing devices and systems, such as servers and netbooks, may also be used.

Computing device 102 includes computer processor(s) 116 and computer-readable storage media 118 (media 118). Media 118 includes an operating system 120, immersive environment module 122, manager module 124, and applications 126, each of which may provide content 128. Computing device 102 also includes or has access to one or more displays 130, four examples of which are illustrated in FIG. 1.

Immersive environment module 122 provides an environment by which a user may view and interact with one or more of applications 126 and corresponding content 128. In some embodiments, this environment presents content of, and enables interaction with, applications with little or no window frame and/or without a need for a user to manually size or position content. This environment can be, but is not required to be, hosted and/or surfaced without use of a windows-based desktop environment. Thus, in some cases immersive environment module 122 presents an immersive environment that is not a window (even one without a substantial frame) and precludes usage of desktop-like displays (e.g., a taskbar). Further still, in some embodiments this immersive environment is similar to an operating system in that it is not closeable or capable of being un-installed. Examples of immersive environments are provided below as part of describing the techniques, though they are not exhaustive or intended to limit the techniques.

Manager module 124 enables a user to manage an immersive environment and applications 126 presented in the environment. Manager 124 and/or module 122 can be separate from each other and/or operating system 120, or may be combined or integrated in some form. Thus, in some cases operating system 120 includes immersive environment module 122 and manager 124.

Figure 2:
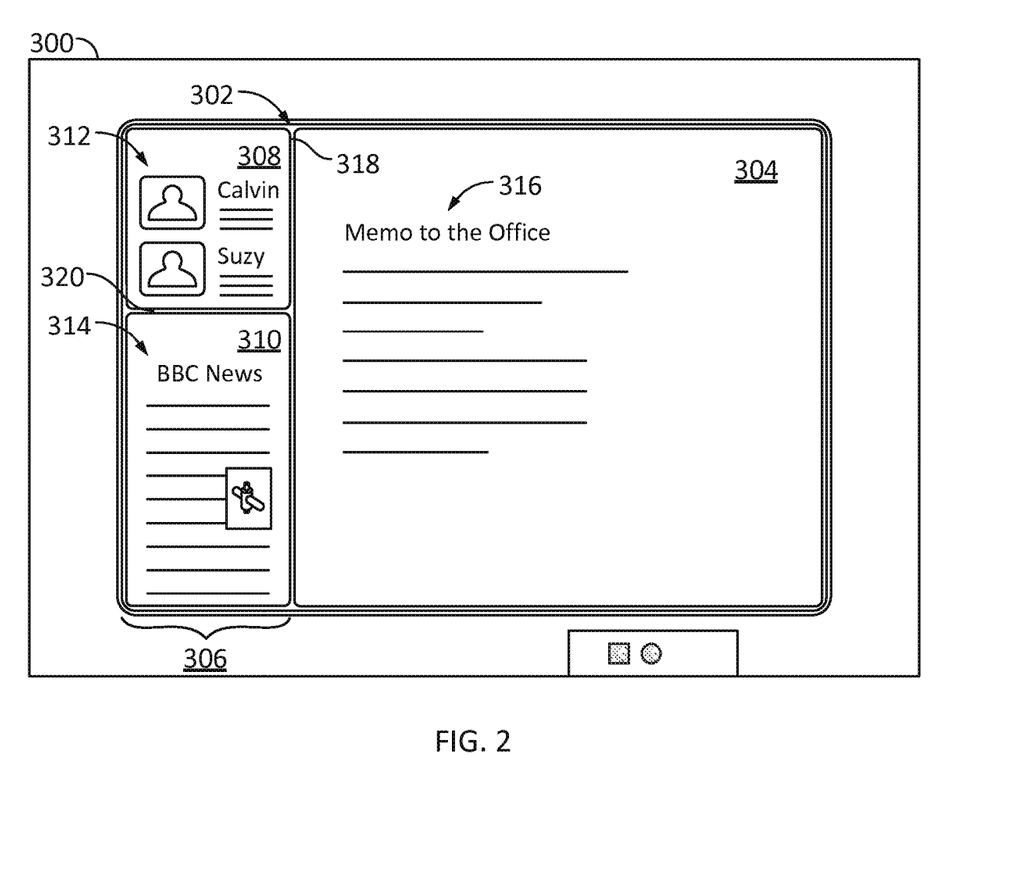
FIG. 2 illustrates an example display having an immersive environment in which the content of three applications is presented.

FIG. 2 shows application work area 300 filled with immersive environment 302. The immersive environment 302 is divided by the manager module 124 into two work areas or regions: a primary region 304 and a non-primary region 306. The two regions 304 and 306 are dividing by a splitting boundary 318. Both the primary region 304 and the non-primary region 306 present various content 128 of applications 126. Note that non-primary region 306 includes two non-primary sections 308 and 310, each of which may be used to present content simultaneously (e.g., in parallel) with each other and that of primary region 304. The non-primary sections 308 and 310 are divided by splitting boundary 320. In this example, content from three applications is presented in parallel: content 312 from a social networking website which is presented by a web browser application, content 314 from a news website which is presented by a web browser application, and content 316 from a local document-viewing application.

The applications that present content in the primary region 304 and the non-primary region 306 are not limited to the aforementioned web browser and document-viewing applications. Other illustrative examples of applications that may be presented in the immersive environment 302 include, without limitation, spreadsheet applications, word processing applications, email applications, photo editing applications and the like. Moreover, it should be emphasized that while the content of two applications is shown in the non-primary region 306, the non-primary region 306 more generally may present the content of any number of applications, including the content of only a single application.

In a preferred implementation, the immersive environment 302 in the application work area 300 does not include any system chrome. System chrome refers to the user-interactive graphical elements provided by the system for identifying and managing the regions or windows (e.g., primary and non-primary regions 304 and 306). For example, in the case of Microsoft Windows®, system chrome includes the start button, maximize and minimize buttons, taskbars, title bar labels, and so on. System chrome does not include, however, non-user interactive graphical elements such as visible lines and blank areas that may be provided to visually separate the content of different applications but which do not allow the user to manage the applications.

In some implementations the primary region 304 occupies a substantially larger portion of the work area 300 than the non-primary region 306. This allows the user to interact with applications that present content in the primary region 304 which is currently the principal focus of the user's attention. Content presented by other applications which is of lesser immediate importance or less demanding of the user's attention may then be presented in the smaller non-primary region 306 of the work area 300. In this way the user can focus on his or her most important tasks, while still having immediately access to the content provided by other applications.

The non-primary region 306 may be presented anywhere within the work area 300. Its location may be fixed or variable. For instance, in the case of a variable location, the location of the non-primary region may be user-selectable and/or selected by immersive environment module 124 based, for example, on the capabilities of the display device. On the other hand, if the location of the non-primary region 306 is fixed, it may be docked to one side of the work area 300. Such an arrangement, which is shown in the example of FIG. 2, allows the content in the primary region 304 to be more centrally presented within the work area 304, where it can be most conveniently be viewed by the user.

Example Methods

Figure 3:
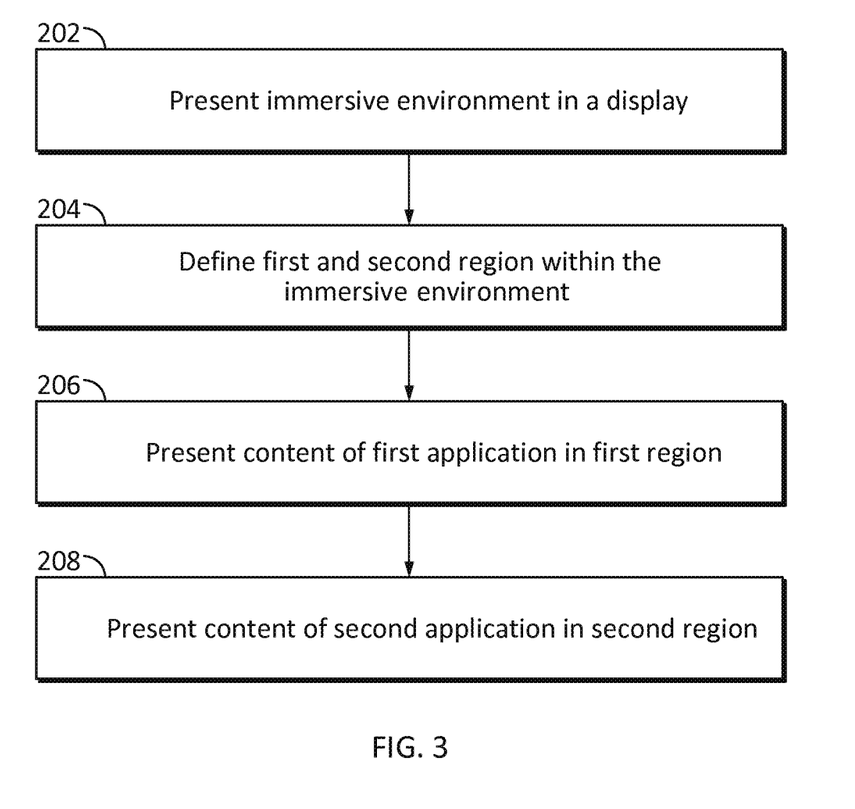
FIG. 3 illustrates a method for presenting the content of various applications in an immersive environment.

FIG. 3 depicts a method for presenting the content of various applications in an immersive environment. In portions of the following discussion reference may be made to illustrative system 100 of FIG. 1 and illustrative immersive environment 302 of FIG. 2, reference to which is made for example only.

Block 202 presents an immersive environment on a display. The immersive environment does not include system chrome. At block 204 a first region and a second region are defined within the immersive environment. The first and second regions do not overlap with one another and therefore are visible to a user at the same time. The first region may be a primary region that is larger in size than the second region. The second region may then serve as a non-primary region that is docked to one side of the display.

At block 206 the content of a first executing user-interactive application is presented in the first region. Likewise, at block 208 the content of one or more other executing user-interactive applications are presented in the second region. The content respectively presented in the first and second regions is presented simultaneously with one another. When two or more applications are presented in the non-primary region, they may be arranged so that that they do not overlap one another.

Figure 4:
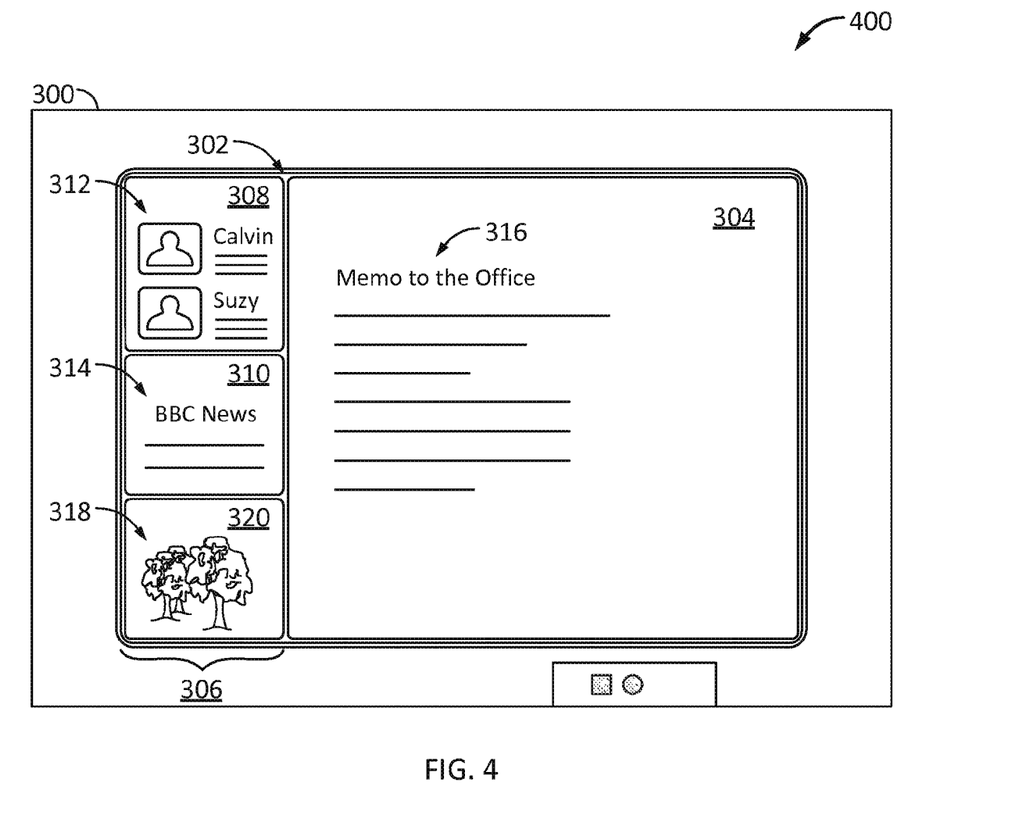
FIG. 4 illustrates an example immersive environment in which the content of four applications is presented.

In some cases the non-primary region may be fixed in size. Accordingly, to ensure that content presented by different applications do not overlap with one another, as additional content from additional applications is presented in the non-primary region, the amount of space allocated to each application decreases. For instance, FIG. 4 shows an application work area 400 similar to the application work area shown in FIG. 2, except that in FIG. 4 the content 312, 314 and 318 of three applications is presented in the non-primary region 306 while the content 312 and 314 from only two applications is shown in FIG. 2.

Figure 5:
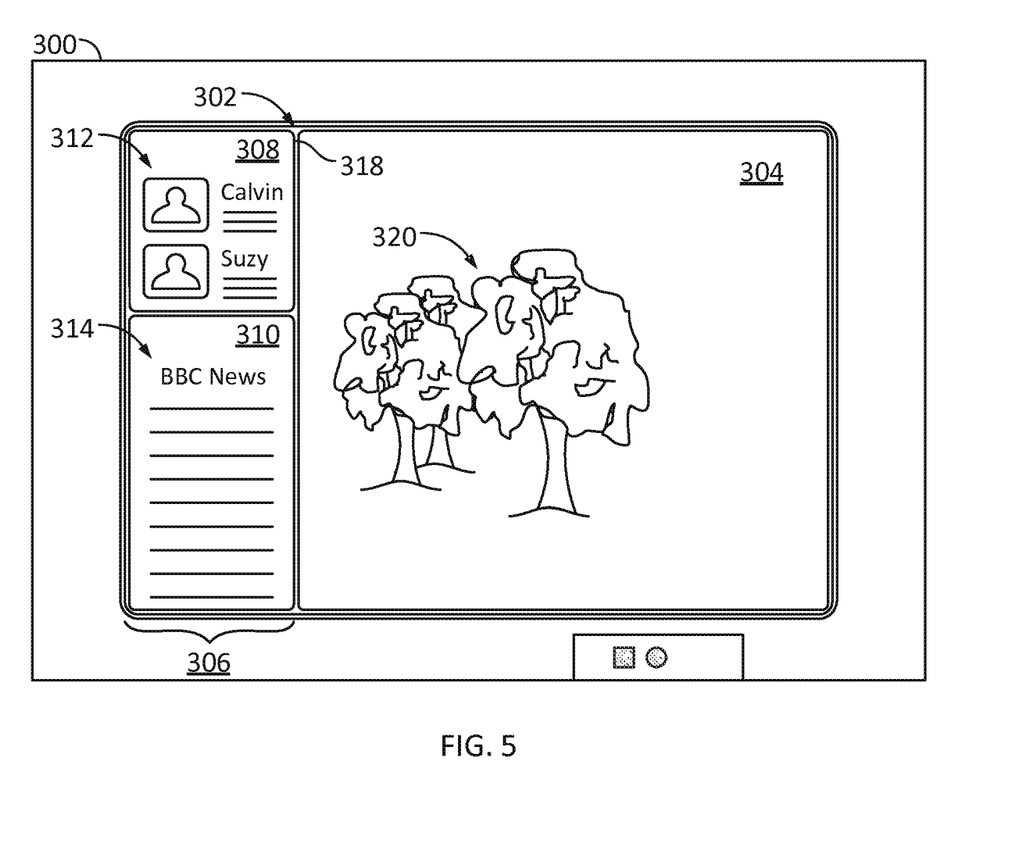
FIG. 5 illustrates an example immersive environment in which the content of the application presented in the primary region of FIG. 2 is replaced with the content of a different application.

The content displayed in the primary region may be replaced with the content of another application. For instance, if the user opens a new application that is to be presented in the primary region, the content that is currently being presented may be removed from the immersive environment or, alternatively, it may be moved into the non-primary region. FIG. 5 shows an application work area in which the content 316 shown in the primary region of FIG. 2 has been replaced with the content of a photo editing application. In this example the original content has been replaced by the content 320 of the photo editing application.

Figure 6:
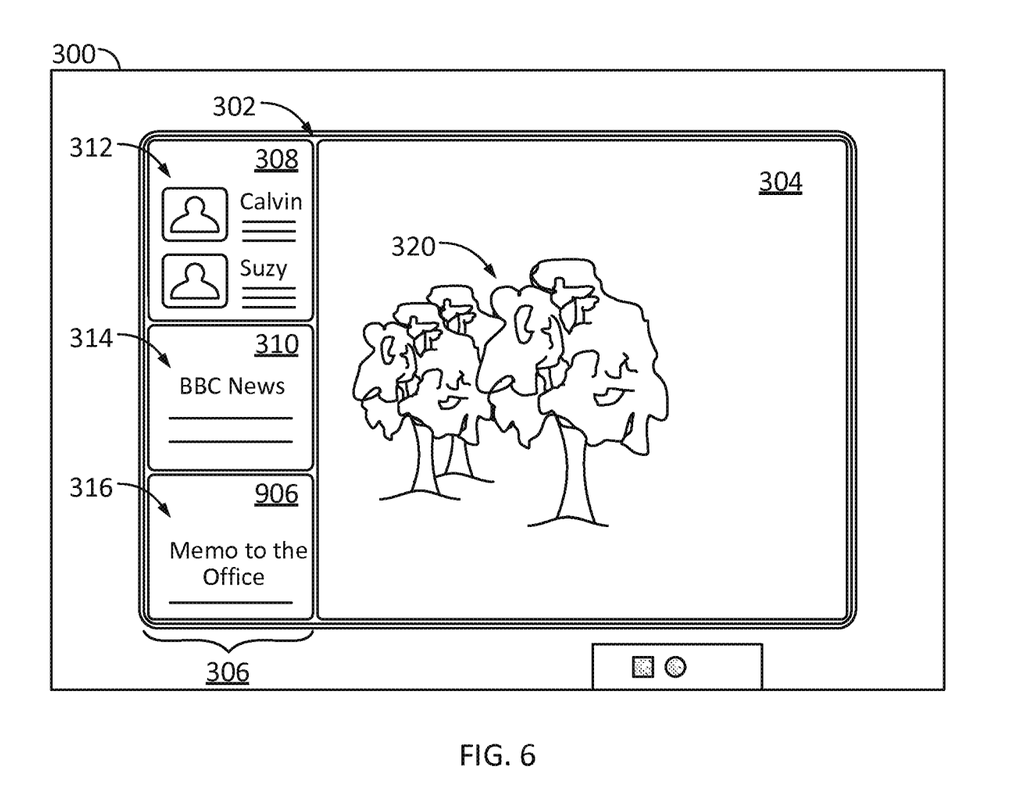
FIG. 6 illustrates an example immersive environment in which the content of the application presented in the primary region of FIG. 2 has been moved to the non-primary region and the content of another application is presented in the primary region.

In some cases the content of one or more applications can be maintained ("pinned") on the display by the user. When an application is pinned, the application remains in either the primary region or the non-primary region, and is movable from one region to the other. For instance, if the user pins the content 312, 314 and 320 in FIG. 5 to the display, then when as in FIG. 6 the content 316 of another application is displayed, the content 312, 314 and 320 remains on the screen. That is, in FIG. 6, the original content 316 of the document-viewing application has been added to the non-primary region 306 without replacing the content 312 and 314 of the social networking website and the news website which are presented by web browser applications. The user may also pin the content 316 to the display. In this case, since the content of all three applications is pinned, if the user then moves content 320 from the primary region to the non-primary region, the content 316 will be automatically moved from the non-primary region to the primary region.

In general, the content of a given applications may be able to be presented in both the primary region 304 and the non-primary region 306. In some cases, however, an application may be configured so that it can only be presented in one of the regions.

In some implementations the user may be able to remove the non-primary region 306 so that the content in the primary region 304 can occupy the entire work area. At a later time the user can also restore the non-primary region 306. In addition, under certain circumstances the manager 124 may automatically remove the non-primary region. For instance, if the display is rotated into portrait mode the non-primary region may be removed. Likewise, when it is rotated back to landscape mode the manager 124 may restore the non-primary region.

Any of a wide variety of techniques and apparatuses may be provided for allowing users to manage the immersive environment. Such user interface techniques enable a user to select when, where, and/or under what conditions to present applications in this immersive environment. For instance, the manager module 124 of FIG. 1 may enable a user to manage the immersive environment and the applications presented in the environment. In particular, the manager module 124 may enable selection of the user interface with a non-visual selector, such as a hot key or selector movement (e.g., a mouse selector moved to a right edge of primary region 304) or, in the case of a touch screen, a gesture. In some other cases, however, the manager module 124 enables selection through a displayed, selectable user interface control. Illustrative examples of user interface techniques and apparatuses that may be used in connection with an immersive environment may be found in co-pending U.S. application Ser. No. 12/969,474.

Regardless of the particular user interface that is employed, the techniques for creating an immersive environment discussed herein allow users to simultaneously manage multiple applications. Assume, for example, that a user wishes to select a music application that he used yesterday while maintaining an immersive presentation of work-related memos that are currently in a primary area of an immersive environment. These techniques can provide a user interface that presents recently-used applications, such as the music application, and enables the user to quickly and easily present the music application in the primary area while automatically moving the work-related memos into the non-primary area of the immersive environment.

Also by way of example, assume that a user wishes to begin his immersive session each day with the same three applications—a sports website, a business-news website, and work-related memos. These techniques permit the user to select these three applications to be automatically presented and maintained in the immersive environment. The user may simply open the immersive environment or logon to his computing device to have these three applications presented in the environment.

In some implementations the amount of space allocated to the applications when they are presented in the non-primary region of the display may be determined at least in part on minimum maximum sizes that are specified by the applications themselves. This capability allows application developers to effectively participate in the process used by the immersive environment module 122 and/or the manager module 124 when determining how the content of their applications will be presented on the display. For example, different content from different applications may require different amount of screen space in order to be useful. Accordingly, different applications may specify different minimum sizes below which they should no longer be presented in the non-primary region of the display. Likewise, there may be a maximum size above which content may no longer be useful in practice, either because of resolution limitations or for other reasons.

To address these issues applications may specify the size or sizes at which they may be presented on a display device. The allowable size or sizes of an application may be specified in any suitable manner. For instance, an application may specify size requirements such as maximum and/or minimum size limits, a series (i.e., two or more) of different sizes at which the application's content may be presented, a single fixed size, and so on.

The applications may be configured in a well-known manner to expose one or more APIs (application programming interfaces) to enable the immersive environment module 122 and/or the manager module 124 to present the content of the applications in the non-primary region of a display in accordance with the applications' size requirements.

The manager module 124 will attempt to simultaneously present the content from all currently-executing applications while accommodating or satisfying the size requirements specified by each of those applications. To accomplish this, the manager module 124 can be provisioned with display space allocation rules, which may include tie-breaking rules in the event that the size specifications of two or more applications cannot be satisfied. If it is not possible to satisfy the size requirements of any given application, the user will simply not be able to DOCK it in the non-primary region. To the extent that the immersive environment module 122 and/or the manager module 124 can present the content of an application in multiple sizes supported by the application while accommodating any other currently-executing applications, the user may be given the opportunity to choose the size that is actually used.

As previously mentioned, in some implementations the non-primary region 306 shown in FIG. 2 is fixed in size. For instance, it may occupy the full height of the display while having a fixed width of, in one example, 320 pixels. Accordingly, when the size of the non-primary region is fixed in this manner the content of any applications docked in the non-primary region will be fixed in width and will vary in height depending on its size (e.g., height) specifications as well as the size specifications of any other applications that are currently docked.

The height specifications exposed by an application to the manager module 124 may include one or mandatory specifications that are required by the manager module 124. In addition, the manager module 124 may also recognize optional specifications. In some cases a minimum height may be a mandatory specification required by the manager module 124. The manager module 124 may require the minimum height to be no less than some specified value (e.g., between 48 and 240 pixels). If the application specifies an invalid value for the minimum height (e.g., a value outside of the minimum range required by the manager module 124), the application's content will be presented in the non-primary region with a height corresponding to some default value.

It should be noted that reference to height, height requirements, and the like is by way of illustration only. More generally, size requirements may refer to a size in any direction and not simply height. That is, a size requirement may specify the length in one direction of the area occupied by the content of an application in the non-primary region of the display. The direction may be along a vertical axis, a horizontal axis, or any axis there-between.

The specification of a maximum height may be mandatory or optional. If it is specified it should be greater than the minimum specified height. In some cases it may have a default value, which, for example, may be set to infinity, in which case the content of the application will fill whatever portion of the non-primary region is unoccupied.

In some implementations the manager module 124 may also require applications to specify their fill capabilities, which may be specified by selecting among three options: fill, no fill, and fill to maximum size. If the fill option is selected, the application will fill whatever space (e.g., height) is available in the non-primary region down to its minimum size (e.g., height). If the no fill option is selected, the application will only be presented at its minimum size regardless of how much space is available in the non-primary region. Finally, if the fill to maximum size option is selected, the application will fill whatever space (e.g., height) is available in the non-primary region up to its maximum size.

Figure 7:
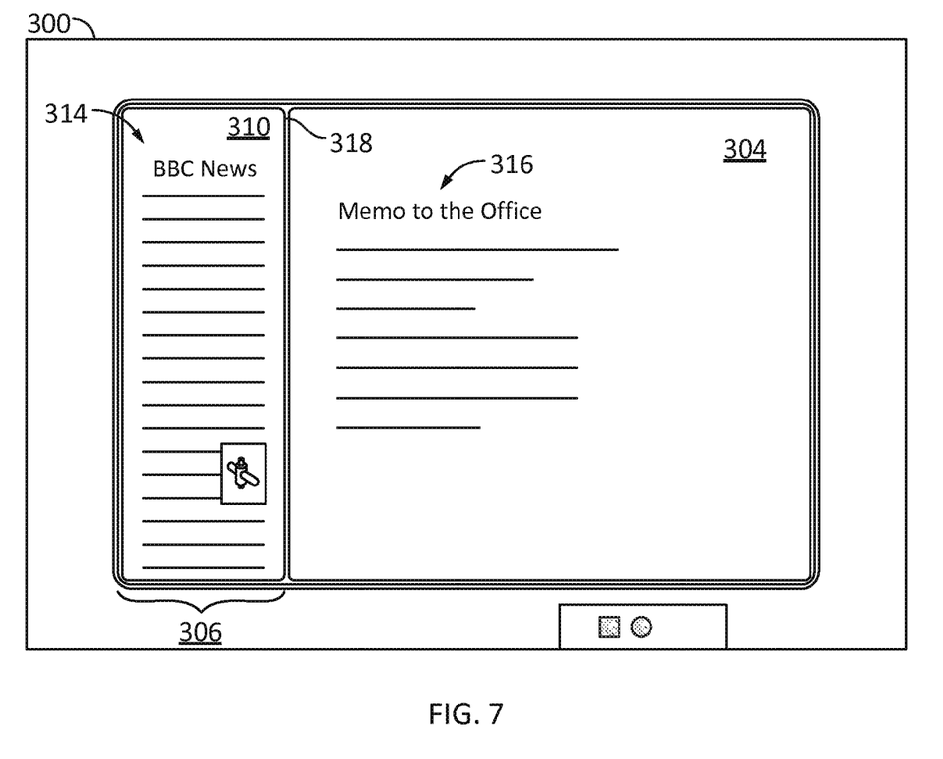
FIG. 7 illustrates an example immersive environment in which the content of a single application fills the non-primary region.

FIG. 7 shows an example immersive environment in which the content 314 of an application is presented in the non-primary region 310. In this example the application has specified its fill capability as fill. Accordingly, as shown, the content 314 occupies all the available space (height), which in this case is the entire non-primary region 306.

Figure 8:
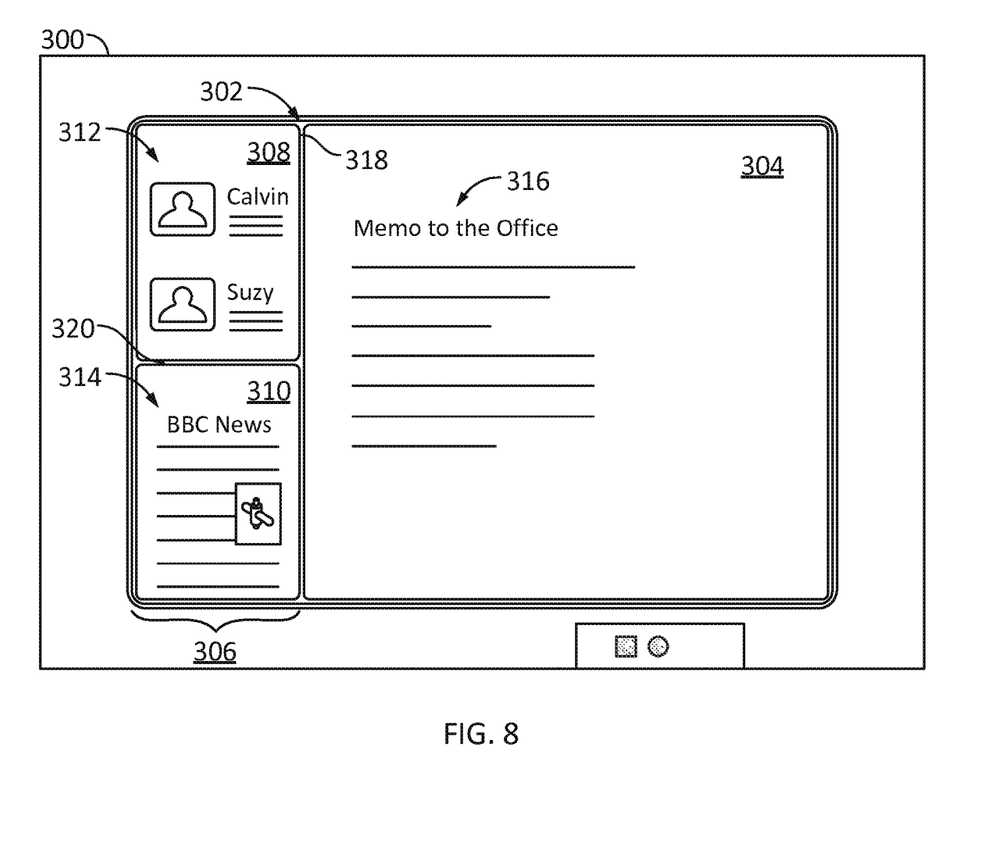
FIG. 8 illustrates an example immersive environment in which the content of two applications equally share the non-primary region.

FIG. 8 shows another example immersive environment in which the content of two applications is presented in the non-primary region. Similar to FIG. 2, the immersive environment presents the content 312 from one web browser application and content 314 from a second web browser application in non-primary region 306. In this example both applications have specified their respective fill capabilities as fill. Accordingly, as shown, the content 312 and content 314 equally share the entire non-primary region 306.

Figure 9:
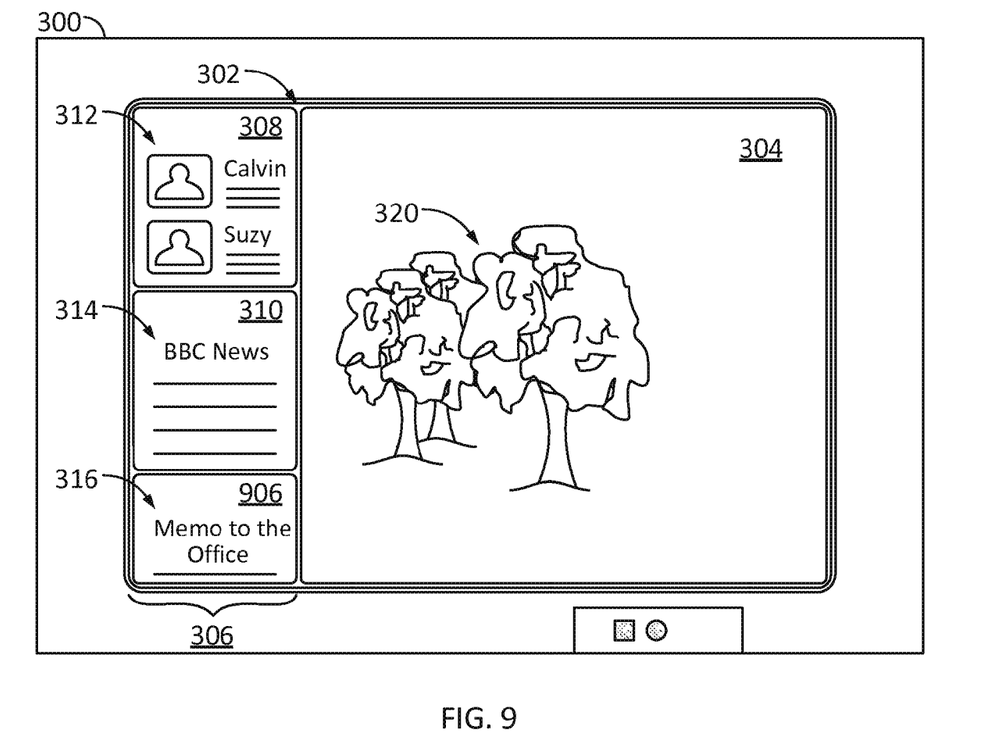
FIG. 9 illustrates an example immersive environment in which the content of three application are presented in the non-primary region, one of which has been minimized by the user and the other two of which equally share the remaining space in the non-primary region.

FIG. 9 shows yet another example immersive environment in which the content of three applications is presented in the non-primary region. In this example case the content 316 of one application has been specified as no fill by the user and the content 312 and 314 of the other two applications have specified their respective fill capabilities as fill. Accordingly, as shown, the content 312 and 314 of the two applications share the remaining space (e.g., height) that is not occupied by the content 316 of the application, which is presented at its minimum size.

The preceding discussion describes methods in which the techniques may operate to provide an immersive environment in the work area of a display. These methods are shown as sets of blocks that specify operations performed but are not necessarily limited to the order shown for performing the operations by the respective blocks.

Aspects of these methods may be implemented in hardware (e.g., fixed logic circuitry), firmware, software, manual processing, or any combination thereof. A software implementation represents program code that performs specified tasks when executed by a computer processor, such as software, applications, routines, programs, objects, components, data structures, procedures, modules, functions, and the like. The program code can be stored in one or more computer-readable memory devices, both local and/or remote to a computer processor. The methods may also be practiced in a distributed computing environment by multiple computing devices.

Example Device

Figure 10:
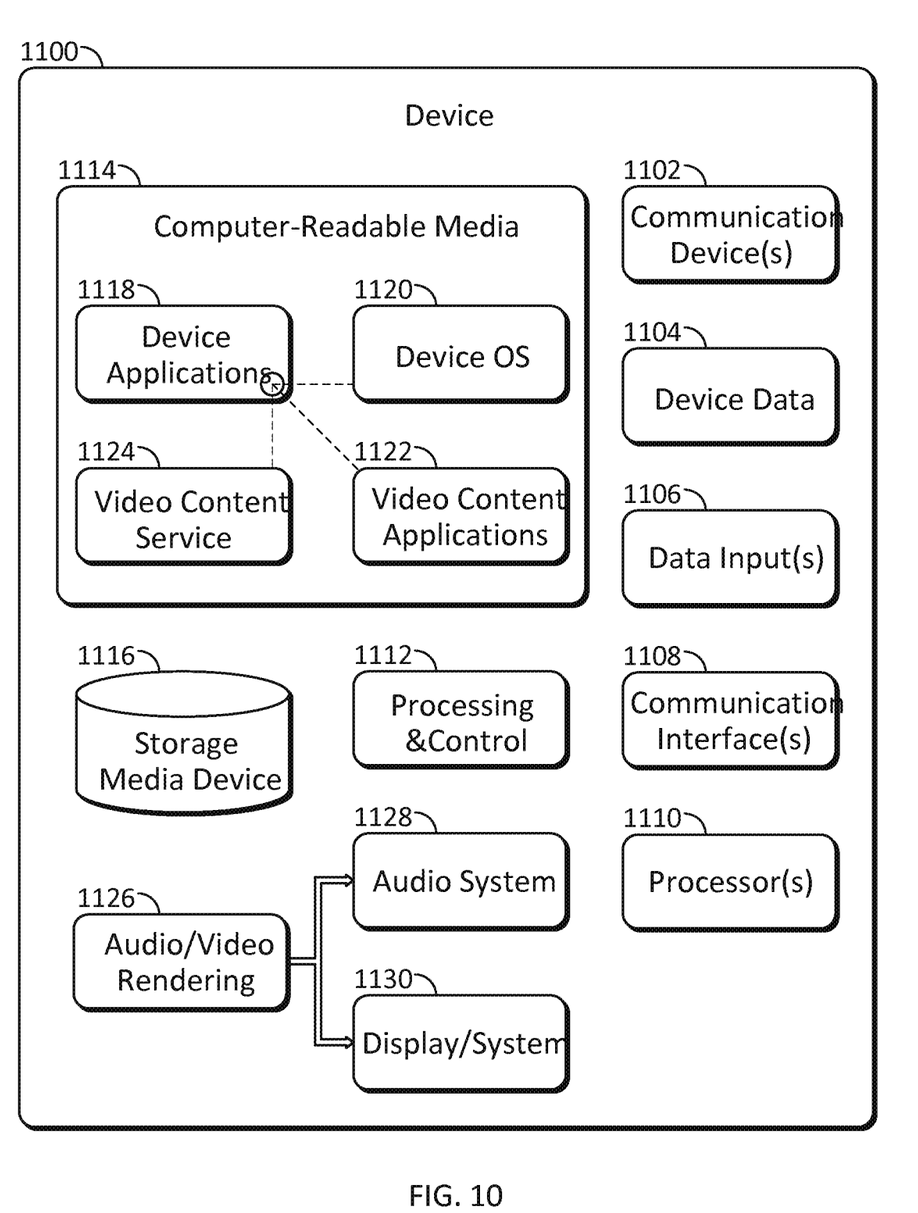
FIG. 10 illustrates an example device in which techniques for creating an immersive environment can be implemented.

FIG. 10 illustrates various components of an example device 1100 that can be implemented as any type of client, server, and/or computing device as described with reference to the previous FIGS. 1-9 to implement techniques for managing an immersive environment. In embodiments, device 1100 can be implemented as one or a combination of a wired and/or wireless device, as a form of television client device (e.g., television set-top box, digital video recorder (DVR), etc.), consumer device, computer device, server device, portable computer device, user device, communication device, video processing and/or rendering device, appliance device, gaming device, electronic device, and/or as another type of device. Device 1100 may also be associated with a user (e.g., a person) and/or an entity that operates the device such that a device describes logical devices that include users, software, firmware, and/or a combination of devices.

Device 1100 includes communication devices 1102 that enable wired and/or wireless communication of device data 1104 (e.g., received data, data that is being received, data scheduled for broadcast, data packets of the data, etc.). Device data 1104 or other device content can include configuration settings of the device, media content stored on the device, and/or information associated with a user of the device. Media content stored on device 1100 can include any type of audio, video, and/or image data. Device 1100 includes one or more data inputs 1106 via which any type of data, media content, and/or inputs can be received, such as user-selectable inputs, messages, music, television media content, recorded video content, and any other type of audio, video, and/or image data received from any content and/or data source.

Device 1100 also includes communication interfaces 1108, which can be implemented as any one or more of a serial and/or parallel interface, a wireless interface, any type of network interface, a modem, and as any other type of communication interface. Communication interfaces 1108 provide a connection and/or communication links between device 1100 and a communication network by which other electronic, computing, and communication devices communicate data with device 1100.

Device 1100 includes one or more processors 1110 (e.g., any of microprocessors, controllers, and the like), which process various computer-executable instructions to control the operation of device 1100 and to implement embodiments for managing an immersive environment. Alternatively or in addition, device 1100 can be implemented with any one or combination of hardware, firmware, or fixed logic circuitry that is implemented in connection with processing and control circuits that are generally identified at 1112. Although not shown, device 1100 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 1100 also includes computer-readable storage media 1114, such as one or more memory devices that enable persistent and/or non-transitory data storage (in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 1100 can also include a mass storage media device 1116.

Computer-readable storage media 1114 provides data storage mechanisms to store device data 1104, as well as various device applications 1118 and any other types of information and/or data related to operational aspects of device 1100. For example, device operating system 1120 can be maintained as a computer application with computer-readable storage media 1114 and executed on processors 1110. Device applications 1118 may include a device manager, such as any form of a control application, software application, signal-processing and control module, code that is native to a particular device, a hardware abstraction layer for a particular device, and so on.

Device applications 1118 also include any system components or modules to implement techniques for managing an immersive environment. In this example, device applications 1118 can include video content applications 1122, such as when device 1100 is implemented as a client device. Alternatively or in addition, device applications 1118 can include a video content service 1124, such as when device 1100 is implemented as a media content service. Video content applications 1122 and video content service 1124 are shown as software modules and/or computer applications. Alternatively or in addition, video content applications 1122 and/or video content service 1124 can be implemented as hardware, software, firmware, or any combination thereof.

Device 1100 also includes an audio and/or video rendering system 1126 that generates and provides audio data to an audio system 1128 and/or generates and provides display data to a display system 1130. Audio system 1128 and/or display system 1130 can include any devices that process, display, and/or otherwise render audio, display, and image data. Display data and audio signals can be communicated from device 1100 to an audio device and/or to a display device via an RF (radio frequency) link, S-video link, composite video link, component video link, DVI (digital video interface), analog audio connection, or other similar communication link. In an embodiment, audio system 1128 and/or display system 1130 are implemented as external components to device 1100. Alternatively, audio system 1128 and/or display system 1130 are implemented as integrated components of device 1100.

Techniques for providing an immersive environment, of which the above-described methods are examples, may be embodied on one or more of the entities shown in system 100 of FIG. 1 and/or example device 1100 described above, which may be further divided, combined, and so on. Thus, system 100 and/or device 1100 illustrate some of many possible systems or apparatuses capable of employing the described techniques. The entities of system 100 and/or device 1100 generally represent software, firmware, hardware, whole devices or networks, or a combination thereof In the case of a software implementation, for instance, the entities (e.g., manager 124 of FIG. 1) represent program code that performs specified tasks when executed on a processor (e.g., processor(s) 116 of FIG. 1). The program code can be stored in one or more computer-readable memory devices, such as computer-readable storage media 118 or computer-readable media 1114. The features and techniques described herein are platform-independent, meaning that they may be implemented on a variety of commercial computing platforms having a variety of processors.

CONCLUSION

Although embodiments of techniques and apparatuses for managing an immersive environment have been described in language specific to features and/or methods, it is to be understood that the subject of the appended claims is not necessarily limited to the specific features or methods described. Rather, the specific features and methods are disclosed as example implementations for managing an immersive environment.

What is claimed is:

1. A computer-implemented method comprising:
receiving a first selection of a first application for parallel presentation in an immersive environment on one or more displays associated with a computing device;
responsive to the first selection, determining an amount of space of a primary region of the immersive environment to allocate for display of the first application, the primary region of the immersive environment not having system chrome;
responsive to the first selection, causing content of the first application to be displayed in the space of the primary region allocated for display of the first application;
receiving a second selection of a second application for parallel presentation with the first application in the immersive environment on the one or more displays associated with the computing device;
responsive to the second selection, determining an amount of space of a non-primary region of the immersive environment to allocate for display of the second application, the non-primary region of the immersive environment not having system chrome, the amount of space of the non-primary region to allocate for the display determined based on a predefined fill, no fill, or fill to maximum size requirement of requirements specified in the second application, the amount of space being:
for the predefined fill size requirement, all available space in the non-primary region;
for the predefined no fill size requirement, an amount of space within the non-primary region equal to the minimum size specified by the predefined no fill requirement; or for the predefined fill to maximum size requirement, all available space within the non-primary region equal to or less than a maximum size specified by the predefined fill to maximum size requirement;

responsive to the second selection, causing selected content of the second application to be displayed in the space of the non-primary region allocated for display of the second application, the selected content of the second application based on the requirements specified in the second application and the selected content being less than content of the second application that would be displayed in the space of the primary region allocated for display; and enabling interaction with the second application through the non-primary region of the immersive environment and with the first application presented in the primary region of the immersive environment.

2. A computer-implemented method as recited in claim 1, further comprising resizing the selected content of the second application for display in the non-primary region based on the one of the predefined size requirements.

3. A computer-implemented method as recited in claim 1, wherein the one of the predefined size requirements is the predefined no fill size requirement.

4. A computer-implemented method as recited in claim 1, further comprising, in response to receiving a third selection to minimize the selected content of the second application, reducing the amount of space of the non-primary region allocated for display of the selected content of the second application based on a minimum height requirement of one of the predefined size requirements.

5. A computer-implemented method as recited in claim 1, wherein the one of the predefined size requirements is the predefined fill to maximum size requirement.

6. A computer-implemented method as recited in claim 1, wherein the one of the predefined size requirements further indicates whether to allocate the amount of space of the non-primary region based on an amount of currently unoccupied space in the non-primary region.

7. A computer-implemented method as recited in claim 1, wherein the one of the predefined size requirements of the second application specifies a height requirement or a width requirement as a number of pixels.

8. A computer-implemented method as recited in claim 1, wherein determining the amount of space of the non-primary region to allocate is also based on a predefined size requirement of the first application displayed in the primary region of the immersive environment.

9. A computer-implemented method comprising:
   presenting first content of a first application in a primary region of an immersive environment, the primary region of the immersive environment not having system chrome;
   receiving selection of second content of a second application for presentation in the primary region of the immersive environment;
   causing presentation of the first content of the first application to be moved to a non-primary region of the immersive environment, the non-primary region of the immersive environment not having system chrome and being smaller than the primary region;
   causing the first content, when presented in the non-primary region of the immersive environment, to be adjusted in accordance with content sizing requirements associated with the first application, the adjustment causing the first content when displayed in the non-primary region to be less than the first content when displayed in the primary region, the content sizing requirements including a fill, no fill, or fill to maximum size requirement and the adjustment causing the first content to be displayed filling the non-primary region for the fill requirement, filling a minimum size for the no fill requirement, or filling available space within the non-primary region equal to or less than a maximum size for the fill to maximum size requirement;
   causing the second content of the second application to be presented in the primary region of the immersive environment; and
   enabling interaction with the first content through the non-primary region of the immersive environment and with the second content presented in the primary region of the immersive environment.

10. A computer-implemented method as recited in claim 9, wherein the content sizing requirements associated with the first application are exposed through an application programming interface (API) associated with the first application.

11. A computer-implemented method as recited in claim 9, wherein the content sizing requirements define a width at which the first content of the first application is to be presented within the immersive environment.

12. A computer-implemented method as recited in claim 9, wherein the content sizing requirement is the no fill requirement and causing the first content to be adjusted includes ensuring that the non-primary region has a space sufficient to allow presentation of the first content in accordance with the minimum size.

13. One or more computer-readable storage media comprising instructions that, responsive to execution by a computing device, cause the computing device to perform operations comprising:
   receiving selection of an application for parallel presentation in an immersive environment on one or more displays associated with the computing device;
   responsive to the selection, determining an amount of space of a non-primary region of the immersive environment to allocate for display of the selected application, the non-primary region of the immersive environment not having system chrome, the amount of space of the non-primary region to allocate determined based on a predefined fill, no fill, or fill to maximum size requirement of requirements specified in the selected application, the amount of space being:
      for the predefined fill size requirement, all available space in the non-primary region;
      for the predefined no fill size requirement, an amount of space within the non-primary region equal to the minimum size specified by the predefined no fill requirement; or
      for the predefined fill to maximum size requirement, all available space within the non-primary region equal to or less than a maximum size specified by the predefined fill to maximum size requirement;
   causing selected content of the selected application to be displayed in the space of the non-primary region allocated for display of the selected application and in parallel with display of content of a different application presented in a primary region of the immersive environment, the primary region of the immersive environment not having system chrome, the selected content of the selected application being less than content of the selected application that would be displayed in a space of the primary region; and
   enabling interaction with the selected application through the non-primary region of the immersive environment and with the different application presented in the primary region of the immersive environment.

14. One or more computer-readable storage media as recited in claim 13, wherein the amount of space is all available space in the non-primary region.

15. One or more computer-readable storage media as recited in claim 13, further comprising additional instructions that, responsive to execution by the computing device, cause the computing device to perform the operations further comprising resizing content of another application displayed in another space of the non-primary region based on another size requirement of the other application.

16. One or more computer-readable storage media as recited in claim 13, wherein the amount of space is equal to the minimum size specified by the size requirement.

17. One or more computer-readable storage media as recited in claim 13, wherein the amount of space is equal to or less than a maximum size specified by the size requirement and a fixed width specified by the size requirement.

18. One or more computer-readable storage media as recited in claim 13, wherein the amount of space is equal to the minimum size specified by the size requirement, wherein the size requirement of the selected application specifies a height requirement or a width requirement as a number of pixels.

19. One or more computer-readable storage media as recited in claim 13, wherein determining the amount of space of the non-primary region to allocate is further based on another size requirement of another application displayed in another space of the non-primary region of the immersive environment.

* * * * *